Nov. 26, 1929.   F. JOHNSTON   1,737,160
VEHICLE BODY MOUNTING
Filed Dec. 15, 1927
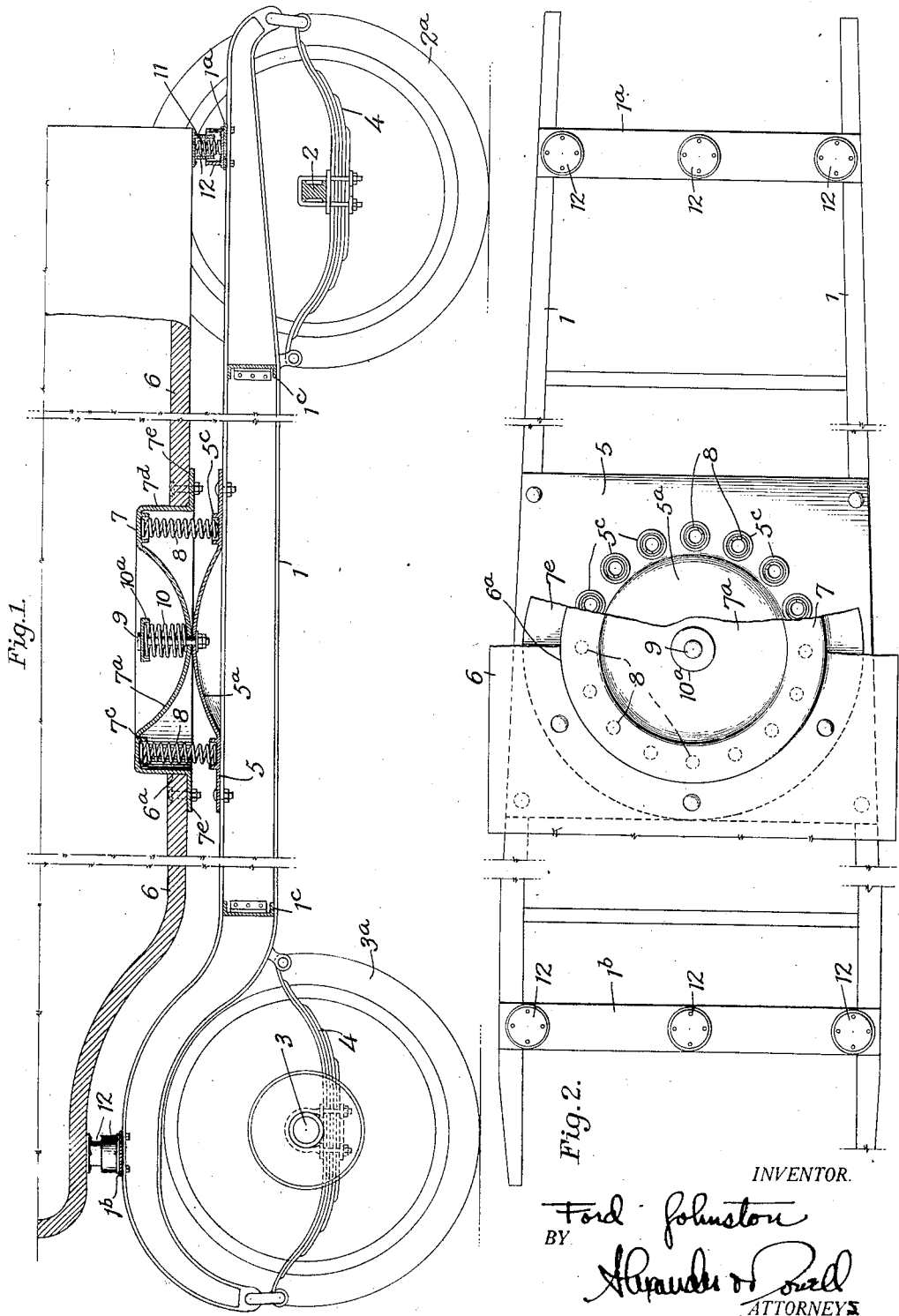
INVENTOR.
Ford Johnston
BY
ATTORNEYS Patented Nov. 26, 1929

1,737,160

UNITED STATES PATENT OFFICE

FORD JOHNSTON, OF DALLAS, TEXAS

VEHICLE BODY MOUNTING

Application filed December 15, 1927. Serial No. 240,286.

This invention is a novel improvement in vehicle body mountings particularly adapted for use in connection with body mountings for automobiles and the like.

The principal objects of the invention are to provide a frictionless universal rocking support for an automobile body on its chassis at its approximate center of gravity only; to eliminate jolting and jarring of the body while the vehicle is in motion, and to insure as easy riding in the rear seat as in the front; to give the sensation of flying rather than riding, the actual location of the mounting to be determined by the size and type of car body to be installed on the chassis.

In brief the body is constructed on a separate frame from the chassis, and the body rests upon the plate which forms the top or moving part of the mounting.

A car equipped with this mounting will be free from the jolt and jar of the road, as the motor and all the moving parts of the car will be fastened to and supported upon the frame of the chassis, and the only weight on the upper or body frame will be the body itself.

The point upon which the mounting which supports the body is fastened to the frame of the chassis will be very close to the center of the body, and the jolting of the chassis due to irregularities of the road would naturally be least at that point.

By establishing the mounting at a point almost in the center of the length of the car and exactly in the center as to width, I have selected the point in the chassis which is least affected by irregularities of the road. This will cause but slight movement of the body even upon rough roads, and will cause little or no discomfort to the persons riding in the rear seat of the body. Other advantages of my body mounting are, that the life of the body will be inestimably lengthened; that the use of solid tires is made possible because of the fact that the shock from same will have little effect upon the body of the car; and that a car equipped with my mounting should be able to travel the roughest roads at any given speed with equal comfort to the driver and the occupants of the rear seat.

I will explain the invention with reference to the accompanying drawing which illustrates one practical embodiment thereof to enable others to adopt and use the same; and will summarize in the claims the novel features of construction, and novel combinations of parts, for which protection is desired.

In said drawings:—

Figure 1 is a vertical longitudinal section through the vehicle showing the mounting and the adjacent portions of the chassis and body;

Fig. 2 is a plan view thereof with the top plate of the mounting partly broken away.

As shown in the drawing, the side frames 1 of the vehicle chassis are conventionally shown attached to the front and rear axles 2 and 3 by means of the usual semi-elliptic springs 4 or the like, the front and rear axles 2 and 3 carrying the usual front and rear wheels $2^a$ and $3^a$. The side frames 1 of the chassis are connected at their front and rear ends by transverse frame members $1^a$ and $1^b$ lying respectively in the planes of the adjacent portions of the side frames 1; also other cross members $1^c$ may connect the side frames 1.

Extending between and suitably secured to the side frames 1 of the chassis at its approximate center is a plate 5, preferably of metal, having at its center an upwardly bulged partially spherical portion $5^a$ coaxial with the longitudinal axis of the chassis, said portion $5^a$ having a perforation at its center for the reception of a bolt as hereinafter explained. Concentric with the spherical portion $5^a$, and evenly spaced upon a pitch circle of diameter slightly larger than the extent of the spherical portion $5^a$, are a series of cups $5^c$ (sixteen being shown in Fig. 2) adapted to receive the lower ends of coil springs, hereinafter described, to center the springs and prevent lateral movement thereof. Cups $5^c$ may be formed integral with plate 5 or may constitute tongues struck-up from plate 5, or may be formed separately and secured to plate 5 in any desired manner.

The floor 6 of the vehicle body has a preferably circular opening $6^a$ in its bottom at approximately the center of the body and coaxial with the longitudinal axis thereof, said opening being of somewhat larger diameter than the overall diameter of the pitch circle of cups 5°, opening 6ᵃ being adapted to receive a pan-shaped member 7 coacting with plate 5.

Plate 7 has a centrally downwardly bulged partially spherical portion 7ᵃ adapted to seat upon the spherical portion 5ᵃ of plate 5, said portion 7ᵃ also having a perforation at its center for the purpose hereinafter described. Upon the lower side of plate 7 opposite each of the cups 5° are cups 7°, similarly formed to cups 5°, and adapted to receive and properly space the upper ends of the coil springs hereinafter described. Plate 7, exterior to the cups 7° is flanged downwardly as at 7ᵈ and adapted to be fitted into the opening 6ᵃ in body 6 from the lower side of the body. The lower portion of flange 7ᵈ is flanged outwardly as at 7ᵉ and may be bolted or otherwise secured to the floor boards 6, of the body, whereby the major portion of pan-shaped member 7 is contained entirely within the vehicle body as clearly illustrated in Fig. 1.

Between the sets of cups 5° and 7° are placed coil springs 8, the size strength and number of springs used being governed by the size and type of the vehicle body. Springs 8 moreover act as supporting units at the outer portions of the members 5 and 7 and serve to maintain the body normally parallel with the chassis while permitting the spherical portion 7ᵃ of member 7 to roll or rock universally and without friction upon the spherical portion 5ᵃ of plate 5. Springs 8 also act as shock absorbers between the vehicle body and chassis frames 1.

Plate 7 is centered on plate 5 by means of a bolt 9 passing through the perforations at the centers of portions 5ᵃ, 7ᵃ. Preferably a coil spring 10 is inserted between the member 7ᵃ and the head of bolt 9 above the member 7, a cup washer 10ᵃ being employed, as shown in Fig. 1; said spring 10 yieldably maintaining the centers of the portions 7ᵃ and 5ᵃ in contact, and at the same time yieldingly tending to maintain the plates 7 and 5 in normal parallel relation since any rolling or rocking movement between plates 7 and 5 will separate the centers of plates 7 and 5 and will hence contract the spring 10. Therefore spring 10 on the upper side of plate 7 and the sixteen springs 8 between plates 7 and 5 will tend to maintain the plates 7 and 5 parallel while permitting substantially frictionless universal rocking or rolling movement of plate 7 on plate 5.

To further absorb shocks transmitted by frame 1 to the body 6, and also to yieldably maintain the body 6 in proper relation to frames 1, I provide springs 11 at the center and ends of the cross members 1ᵃ and 1ᵇ of frames 1, said springs being interposed between the frames 1ᵃ, 1ᵇ, and the front and rear ends of the vehicle body as shown in Fig. 1. The springs 11 are housed in loosely fitting telescoping sleeves 12 adapted to prevent side swing of the body with respect to side frames 1, due to its being mounted at the one central point only on the chassis.

The mounting above described will tend to reduce vibration in the body because all the moving parts of the car can be supported upon the chassis frame, however the radiator, fenders, splash apron and running boards may be all fastened to the body frame.

A special means may be employed to connect the radiator carried by the body frame with the motor carried by the chassis so that the movement of the radiator with the body frame will not in any manner affect its working. A like solution may be made of the steering arrangement, allowing for the movement of the body at the point where it comes in contact with the steering post with freedom of action and without sacrificing any stability of the steering arrangement.

The gas tank, spare tires, luggage carriers, etc., for carrying extra heavy loads on the car may be supported on the chassis frame and not upon the body frame, thereby again eliminating much rough riding and wear and tear due to a heavy load.

I do not limit my invention to the exact form shown in the drawing for obviously changes may be made therein within the scope of the claims.

I claim:

1. In combination, a vehicle chassis, a vehicle body having an opening in its bottom, a member mounted on the chassis having an upwardly bulged portion; a second member having a portion extending upwardly through the opening provided with a downwardly bulged portion adapted to seat upon that of the first member; means on the second member adapted to support the body; means for normally yieldably maintaining the bulged portions of the members centered; and means for normally yieldably maintaining the body parallel with the chassis.

2. In combination, a vehicle chassis; a vehicle body; said body having a centrally disposed opening in its bottom; a plate mounted on the chassis and having an upwardly bulged portion; a pan shaped member extending upwardly through the opening in the body and having a corresponding downwardly bulged portion adapted to seat upon that of the plate; a peripheral flange around the pan shaped member adapted to underlie and support the body; means for yieldably maintaining the bulged portions of the two plates centered and a series of spaced springs interposed between the plates around the bulged portions for normally maintaining the plates in parallel relation.

3. In combination, a vehicle chassis; a vehicle body; said body having a centrally and axially disposed opening in its bottom; a plate mounted on the chassis and having an upwardly bulged partially spherical portion; a pan shaped member extending upwardly through the opening in the vehicle body and having a corresponding downwardly bulged partially spherical portion adapted to seat upon that of the plate; a peripheral flange around the lower portion of the pan shaped member adapted to underlie the adjacent portions of the vehicle body to support the same; means for yieldably maintaining the centers of the bulged portions of the two plates together while permitting universal rocking of one portion on the other; and a series of spaced springs interposed between the plates around the bulged portions for normally maintaining the plates in parallel relation.

FORD JOHNSTON.